UNITED STATES PATENT OFFICE.

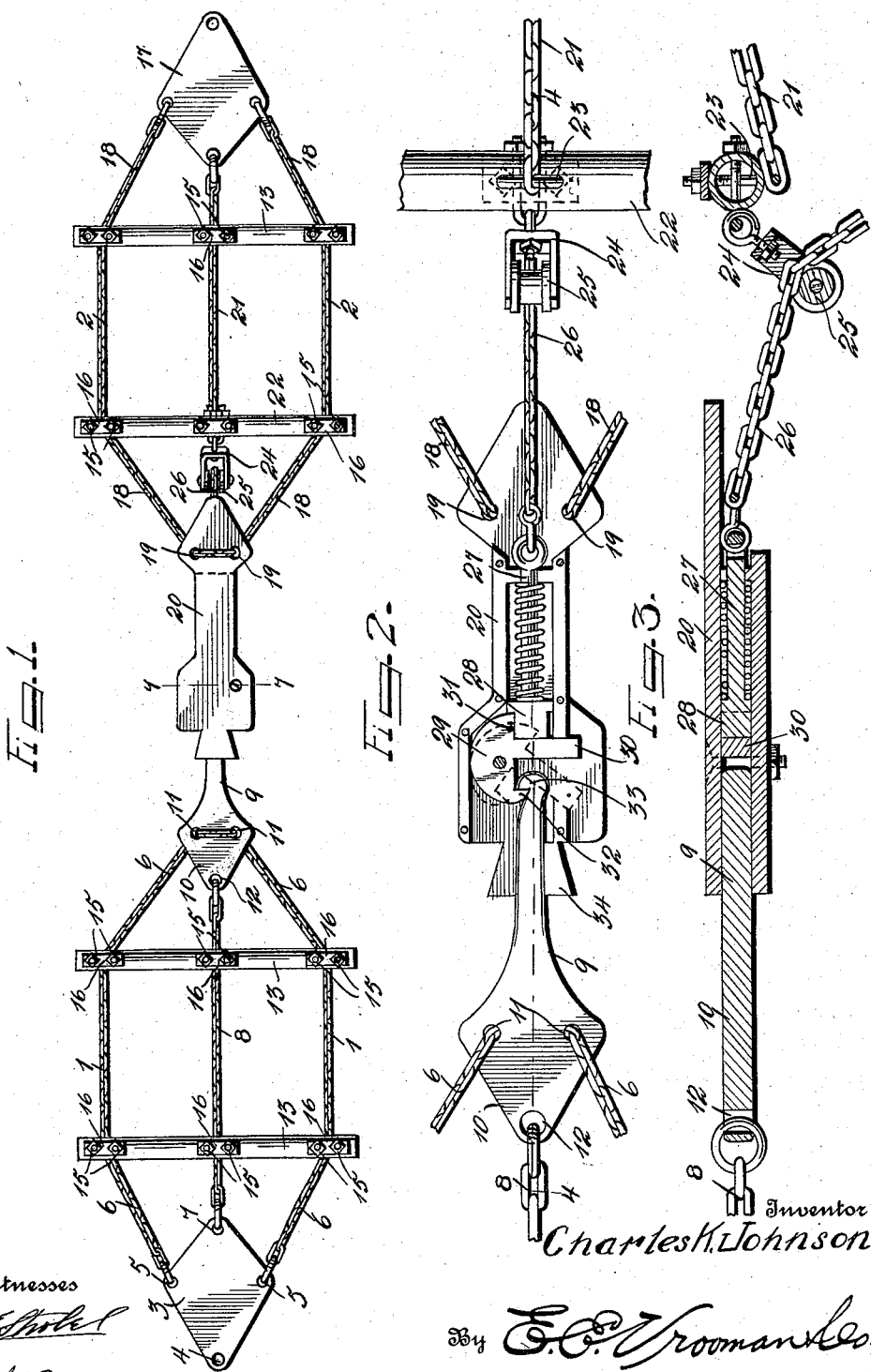

CHARLES K. JOHNSON, OF KOSSUTH COUNTY, IOWA.

HAY-UNLOADER.

1,166,594.     Specification of Letters Patent.     Patented Jan. 4, 1916.

Application filed November 10, 1914. Serial No. 871,351.

*To all whom it may concern:*

Be it known that I, CHARLES K. JOHNSON, a citizen of the United States of America, residing in the county of Kossuth and State of Iowa, have invented certain new and useful Improvements in Hay-Unloaders, of which the following is a specification, reference being had therein to the accompanying drawing.

This invention relates to hay slings and has for its object the production of a simple and efficient means for releasing the hay sling when so desired for quickly and conveniently discharging hay therefrom.

Another object of this invention is the production of a simple and efficient locking mechanism for controlling the releasing of the hay sling so as to allow hay to be readily discharged therefrom.

With these and other objects in view this invention consists of certain novel combinations, constructions, and arrangements of parts as will be hereinafter fully described and claimed.

In the accompanying drawings:—Figure 1 is a top plan view of the hay sling. Fig. 2 is an enlarged top plan view of the locking mechanism for the hay sling showing the cover plate removed therefrom. Fig. 3 is a section taken on line 4—4, of Fig. 2.

By referring to the drawings it will be seen that the hay sling comprises a primary section 1 and an auxiliary section 2. The primary section 1 comprises an end plate 3 which is substantially diamond shape and is provided with a securing eye 4 at one end for the purpose of facilitating the connection of the securing plate 3 to a support. A plurality of side apertures 5 are formed in the securing plate 3 to which the side chains 6 of the primary section of the sling are secured. The securing plate 3 is provided with an aperture 7 near its forward end to which the central brace chain 8 is secured. A locking tongue 9 is carried by the primary portion of the sling and comprises an enlarged rear end 10 having a plurality of side apertures 11 through which the side chains 6 pass as illustrated in Fig. 1 for securing the tongue 9 thereto. The central brace chain 8 is connected to the enlarged head 10 by being fastened through an aperture 12 formed in the enlarged head 10. A plurality of transversely extending bars 13, preferably formed of hollow pipe, extend transversely of the chains 6 and 8, and these pipes are secured thereto by means of the substantially U-shaped connecting bolts. These bolts pass transversely through the rods or pipes 13 and have their respective ends provided with threaded nuts 15 for firmly clamping the bolts through the pipes 13 and holding the chains 6 and 8 in firm engagement therewtih. A reinforcing plate 16 is placed under the nuts 15 adjacent each substantially U-shaped bolt to constitute a bearing for receiving the nuts 15.

The auxiliary portion of the hay sling comprises an end plate 17 similar in construction to the end plate 3 of the primary portion, and the end plate 17 engages a pair of side chains 18, which side chains pass through the apertures 19 formed in the rear end of the lock casing 20 as illustrated in Fig. 1. A central brace chain 21 is secured to the end plate 17 and engages a transversely extending bar 22, which bar also engages the side chains 18 and is held in engagement therewith by means of the U-shaped bolts 23. The auxiliary section of the sling like the primary section is provided with a plurality of these transversely extending bars as clearly illustrated in Fig. 1.

A block 24 is connected to the transversely extending bar 22, and this block 24 carries a pulley 25 and a releasing chain 26 passes over this pulley 25 as is clearly illustrated in Fig. 3. This releasing chain 26 is connected to a spring pressed plunger 27 carried by the lock casing 20 as is illustrated in Fig. 2, and this spring pressed plunger 27 carries a locking head 28, which locking head 28 is adapted to engage the pivotally mounted latch 29 for holding the same in a set position. The latch 29 is provided with a laterally extending finger 30 and is also provided with a shoulder portion 31, which shoulder portion and finger are adapted to fit snugly around the head 28 as is illustrated in Fig. 2. The latch 29 is also provided with an inwardly extending spur 32, and this spur 32 is adapted to engage the hooked end 33 of the locking tongue 9. A stop block 34 is carried by the lock casing 20 and limits the swing of the locking tongue 9 in one direction.

The operation of the device is as follows:—The sling is supported in the usual manner by means of the end plates 3 and 17 and the hay is then placed upon the hay sling in the usual manner. When it is desired to dump the hay, the releasing chain 26 is pulled, thereby pulling the plunger head 28 out of engagement with the latch 29 and the weight of the hay will cause the locking tongue 9 to readily pull the latch 29 to the position shown in dotted lines and thereby allowing the locking tongue to be readily disengaged from the lock casing 20.

Having thus described the invention what is claimed as new, is:—

In combination with a hay sling, a locking casing, a spring pressed plunger carried by said locking casing, a head carried by the outer end of said spring pressed plunger, a latch pivotally secured to said casing and provided with a laterally projecting finger, a stop carried by said casing and adapted to engage said laterally projecting finger for permanently limiting the swing of said latch in one direction, a rearwardly extending shoulder formed upon said latch, a laterally extending spur extending parallel with said laterally extending finger and spaced from said finger, a locking tongue provided with a hook engaging said spur and held in said casing thereby, said casing provided with spaced projecting portions upon one end thereof, and constituting guiding means for said locking tongue at the entrance of said casing.

In testimony whereof I hereunto affix my signature in presence of two witnesses.

CHARLES K. JOHNSON.

Witnesses:
  SID J. BACKUS,
  J. B. JOHNSTON.

Copies of this patent may be obtained for five cents each, by addressing the "Commissioner of Patents, Washington, D. C."